(No Model.)
J. W. CARVER.
GUN SIGHT.
No. 424,640. Patented Apr. 1, 1890.
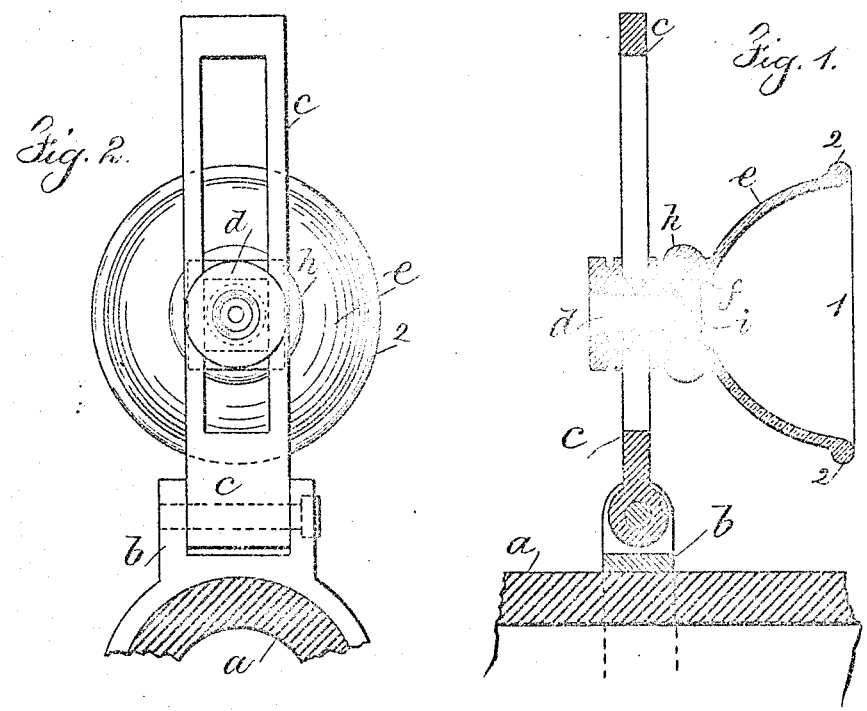
Witnesses
Chas H. Smith
J. Staib
Inventor
James W. Carver
per Lemuel W. Serrell
att

UNITED STATES PATENT OFFICE.

JAMES W. CARVER, OF PAWLET, VERMONT, ASSIGNOR TO HIMSELF, AND GIBBONS L. KELTY, OF BROOKLYN, NEW YORK.

GUN-SIGHT.

SPECIFICATION forming part of Letters Patent No. 424,640, dated April 1, 1890.

Application filed October 19, 1889. Serial No. 327,556. (No model.)

*To all whom it may concern:*

Be it known that I, JAMES W. CARVER, a citizen of the United States, residing at Pawlet, in the county of Rutland and State of Vermont, have invented a new and useful Improvement in Gun-Sights, and the following is declared to be a full, clear, and exact description thereof.

In rifle shooting, and especially target practice, where the gun-sight is brought close to the eye, it sometimes happens that the recoil of the gun brings the sight with force against the eye or face and an injury results; also, in target practice persons who have defective vision and employ glasses are at a great disadvantage in properly sighting the fire-arm.

The object of my invention is to protect the eye and face and to assist those who have defective vision, so that they may become as good marksmen as those with perfect vision.

My invention relates to a cup-shaped eye piece and shield and a glass or lens combined with the adjustable sight. The eye piece and shield I prefer to make of rubber with a contracted portion or neck and a ribbed edge that is adapted to be sprung over the circumferential edge of the metal sight. The lens or glass is held in place against the metal sight within the contracted neck. The shield covers the eye, excluding light, and thus assisting the vision, and the face and eye are protected from injury by the recoil of the gun.

In the drawings, Figure 1 is a vertical section of a gun-sight together with the devices constituting my improvement, and Fig. 2 is an elevation of the same.

$a$ represents part of a gun-barrel; $b$, the pivotal bridge-piece; $c$, the slotted swinging frame, and $d$ the vertically-adjustable sight. These parts may be of any well-known or desired construction, as my improvements are adapted to any form of sight.

$e$ represents my improved cup-shaped eye piece and shield. This I prefer to make of soft rubber with a large opening 1 at one side for the eye and an edge rib at 2 to rest against the face. The other side is made with a contracted portion or neck at $f$ and a curved ribbed edge at $h$. This edge $h$ is adapted to be sprung over the edge of the sight $d$, (see Fig. 1,) securing the eye-piece $e$ in place, the contracted portion $f$ bearing against the surface of the sight $d$. The lens or glass $i$ is to be placed against the surface of the sight $d$, and the eye-piece $e$ is then sprung to place, the lens being held by the contracted portion or neck $f$. The lens $i$ should be adapted to the sight of the marksman whose vision is imperfect, in which case the eyeglasses or spectacles are dispensed with. The lens being held to the gun-sight, is more reliable than ordinary spectacles, as its position remains unaltered to the sight. The eye-piece $e$ may be used either with or without the lens.

I am aware that a glass or lens has been used with gun-sights.

I claim as my invention—

1. The combination, with the gun-sight, of the cup-shaped eye piece and shield made of rubber or similar flexible material and having an edge $h$, adapted to being clasped over the gun-sight, substantially as set forth.

2. The combination, with the gun-sight, of the cup-shaped eye piece and shield $e$, having a rib of flexible material 2 around its outer edge, a contracted portion or neck at $f$, and a ribbed edge at $h$ to clasp over the gun-sight, as set forth.

Signed by me this 7th day of October, A. D. 1889.

JAMES W. CARVER.

Witnesses:
G. W. CARVER,
H. S. WISEMAN.